United States Patent [19]

Lee

[11] 4,081,206
[45] Mar. 28, 1978

[54] ELECTRIC PLUG WITH RETRACTABLE GROUND TERMINAL

[76] Inventor: Hop Lee, 2455 - 24th Ave., San Francisco, Calif. 94116

[21] Appl. No.: 769,839

[22] Filed: Feb. 17, 1977

[51] Int. Cl.² ............................................. H01R 3/06
[52] U.S. Cl. ................................ 339/14 P; 339/31 R; 339/62; 339/195 M
[58] Field of Search ................. 339/14 R, 14 L, 14 P, 339/14 RP, 31 R, 62, 64 R, 64 M, 195 M

[56] References Cited

U.S. PATENT DOCUMENTS 2,984,808  5/1961  Bender ............................ 339/14 RP

*Primary Examiner*—Roy Lake
*Assistant Examiner*—DeWalden W. Jones
*Attorney, Agent, or Firm*—William R. Piper

[57] ABSTRACT

An electric plug that has a retractable ground terminal in addition to the customary two terminals. This ground terminal is connected to the ground wire in the plug cable and when the ground terminal cannot be used, it is swung into a retracted or inoperative position and concealed from view. A ground outlet wire is used when the ground terminal is in inoperative position and this ground wire is wound around a spool when the ground terminal is used. This ground wire is connected by novel means to the ground terminal only when the latter is swung into inoperative position whereby the ground wire may be unwound from its inoperative position on the spool, and electrically connected to the outlet box and thus establish a ground connection from the outlet box to the ground terminal and thence to the ground wire in the outlet cable for the plug.

1 Claim, 11 Drawing Figures

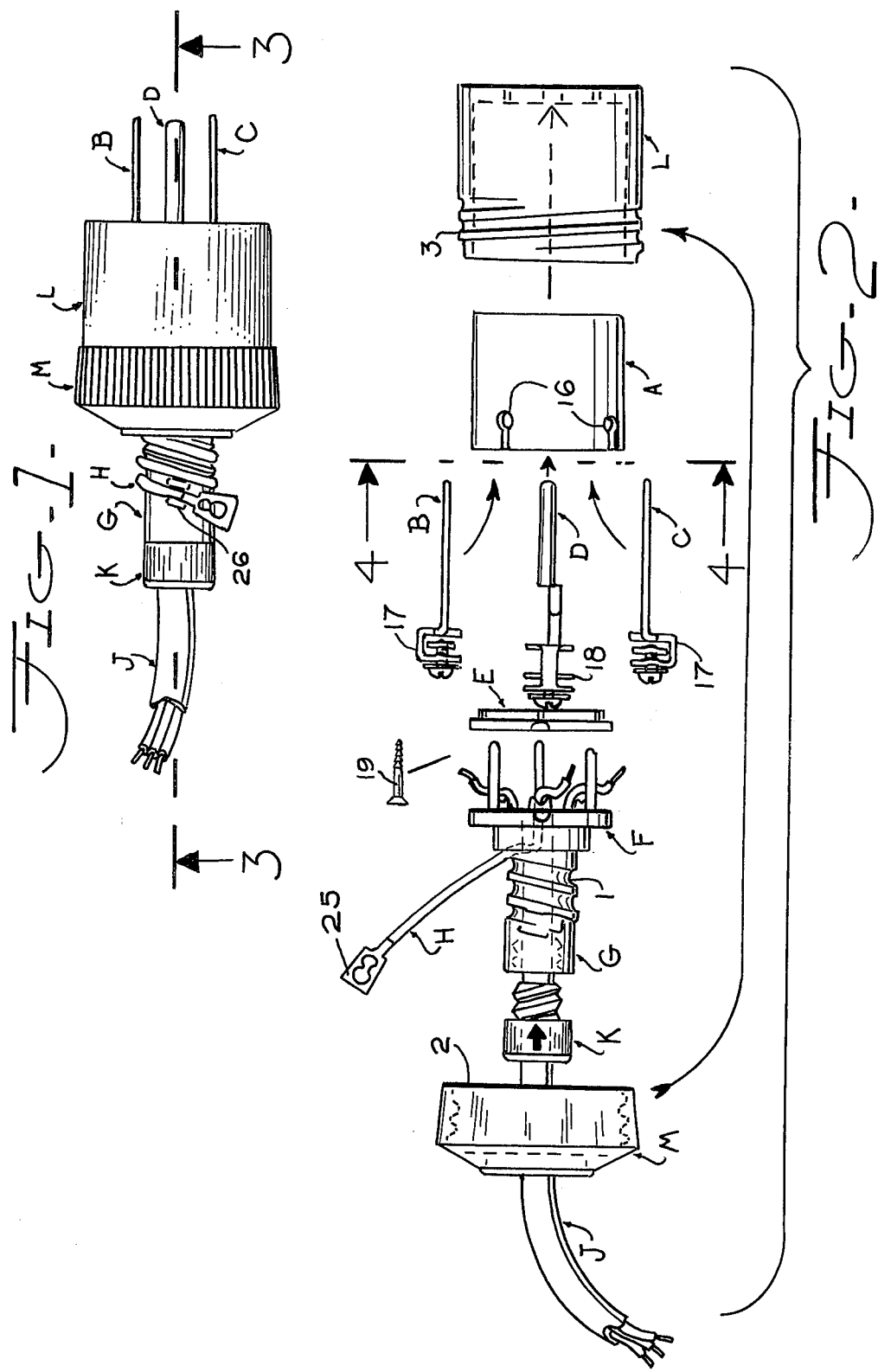

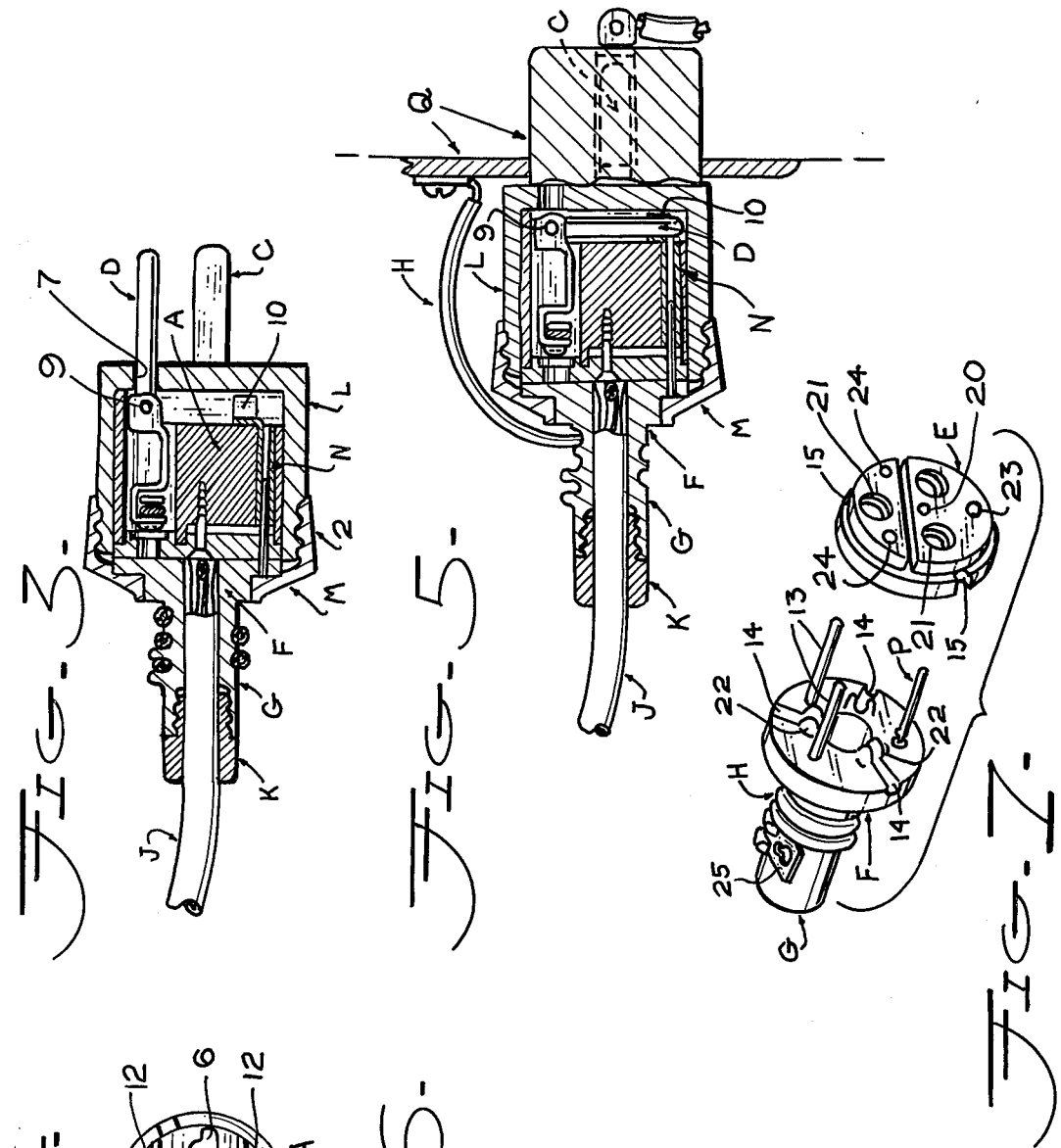

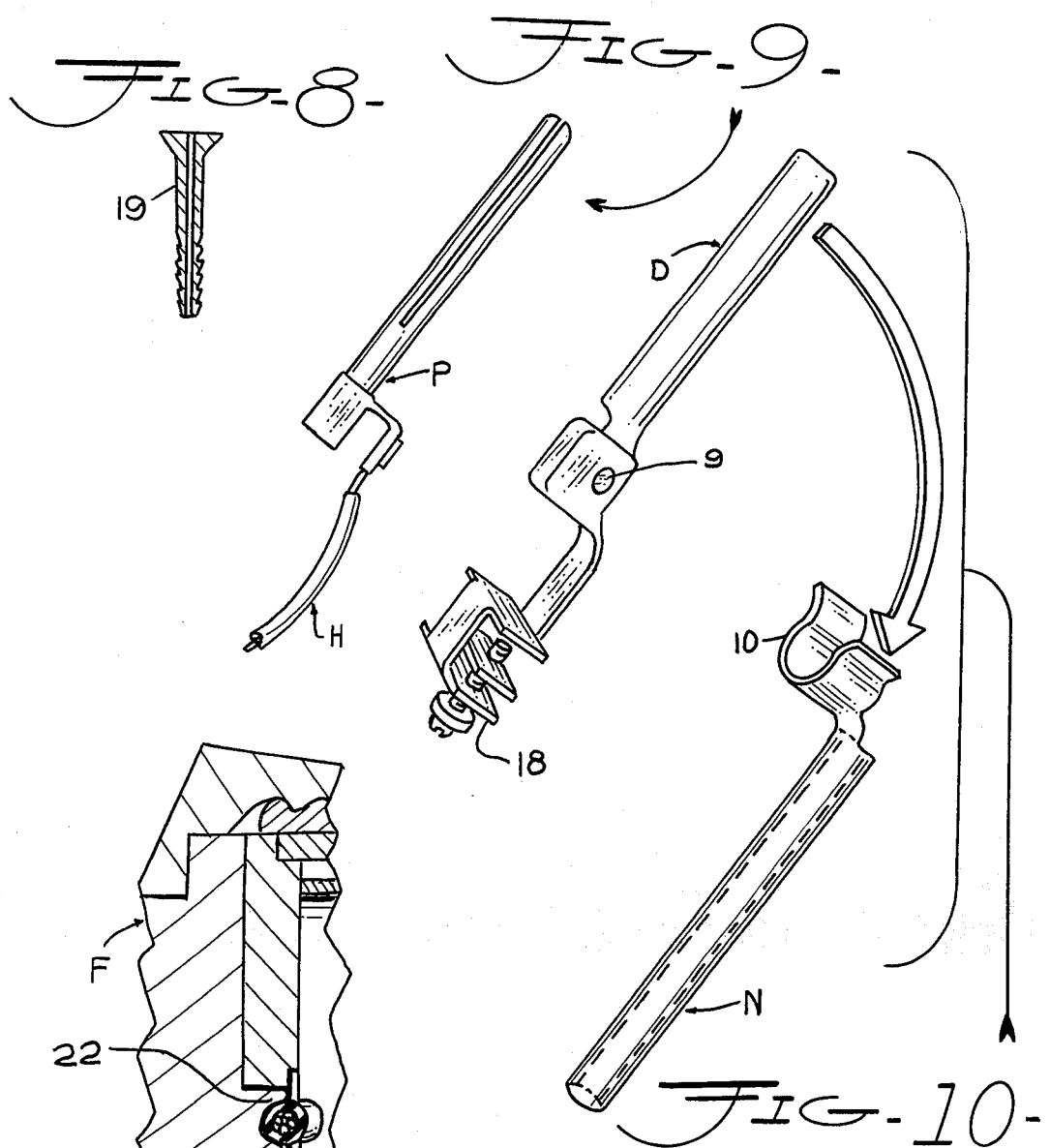

ELECTRIC PLUG WITH RETRACTABLE GROUND TERMINAL

SUMMARY OF THE INVENTION

An object of my invention is to provide an electrode plug having two terminals designed to be removably coupled to a standard electric outlet and has in addition a pivoted ground terminal that cooperates with the first two terminals and when in operative position is adapted to enter a ground terminal socket in the standard electric outlet if the latter is provided with such a socket. If the standard electric outlet is not so equipped with a ground terminal socket, then the ground terminal in the plug is swung into a retracted and concealed position within the plug and is automatically connected to a ground outlet wire on the plug and this wire may be electrically connected to the standard electric outlet. In this way the ground wire in the cable leading from the electric plug is grounded to the standard electric outlet either by the retractable ground plug when that is used or by the ground wire from the retracted ground terminal when the ground terminal cannot be used.

BRIEF DESCRIPTION OF THE DRAWINGS

FIG. 1 is a side elevation of my electric plug showing the retractable ground terminal in operative position.

FIG. 2 is an exploded view of the separated parts that make up the complete electric plug shown in FIG. 1.

FIG. 3 is a longitudinal section taken along the line 3—3 of FIG. 1 and shows the retractable ground terminal in extended position.

FIG. 4 is a view of the end of the inner body of the plug when looking in the direction of the arrows 4—4 of FIG. 2.

FIG. 5 is a longitudinal section similar to FIG. 3, but showing the ground terminal swung into a retracted and concealed position within the plug and electrically connected to the plug ground wire which in turn has been uncoiled from its storage spool and connected to the standard electric outlet.

FIG. 6 is a transverse section taken along the line 6—6 of FIG. 5 and illustrates the electric wire binding posts for the two electric terminals and the swingable ground terminal.

FIG. 7 is an exploded perspective view of the terminal carrier and spool for storing the plug ground wire when not used. The cover disc for one end of the inner body for the plug is also illustrated.

FIG. 8 is an enlarged sectional view of the center ribbed pin used for permanently connecting the cover disc to the inner plug body.

FIG. 9 is an enlarged view of the longitudinally split terminal used for electrically connecting the anchor sleeve to the ground outlet wire carried by the electric plug.

FIG. 10 shows an enlarged exploded view of the anchor sleeve with its saddle adapted to removably receive the pivoted ground terminal when the latter is swung about its pivot into a retracted position.

FIG. 11 is an enlarged sectional view showing how the wires are gripped between projections on the inner end of the terminal carrier and complimentary grooves in the cover disc for the inner plug body.

DESCRIPTION OF THE PREFERRED EMBODIMENT

In carrying out my invention I will first refer to the exploded view where the several parts making up the electric plug are individually shown in elevation. These several parts I will refer to as an inner body A that will receive the two electrode terminals B, and C, and a pivoted "ground" electrode or terminal D in a manner presently to be described. A cover disc E for the inner body A is also shown and to the left of this cover disc is a split terminal carrier F with an integral spool G with a spiral groove 1 for receiving a "ground" wire H for the plug when the wire is not used. The spool G, is hollow and receives a plug cable J that in turn houses the usual two wires and a "ground" wire. A collar K also receives the cable and is threaded into a threaded bore in the spool G.

The inner body A with its electrode terminals B, C and D, is received in an end cap L, and these terminals normally project through openings provided in the closed end of the cap. The split terminal carrier is also received in the cylindrical portion of the end cap L while a top cap M has an opening for permitting this cap to be moved past the collar K, and spool G, and to house the split terminal carrier F and hold it in contact with the disc cover E. The top cap M has an internally threaded cylindrical portion 2, see FIG. 2, that is threaded onto a threaded portion 3 of the end cap L so as to interconnect the two and to house the inner body A, the electrodes B, C and D, the disc cover E and the split terminal carrier F, as shown in FIG. 3.

I will now describe each part of the electric plug in detail and will start with the inner body A, see FIGS. 3 to 6, inclusive. An end view of the inner body is shown in FIG. 4 and longitudinal slots 4 and 5 receive the electrode terminals B and C, shown in FIG. 2 and these two electrodes project through aligned slots in the end cap L. In addition the inner body has another longitudinal bore 6 for receiving the pivoted "ground" terminal or electrode D, and FIG. 3 illustrates how this electrode when in operative position will extend through an opening 7 in the end cap L. The same FIG. 3 shows a diametrically extending groove 8 in the inner end of the body A for receiving the "ground" terminal or electrode D while FIG. 5 shows the electrode D, in the groove 8 when the electrode is swung about its pivot 9 into an inoperative position and is concealed in the end cap L. To accomplish this the body A is temporarily removed from its end cap and the electrode D is swung into the groove 8 after which the body A is reinserted into the end cap L, and held in place by the top cap M. An enlarged perspective view of the "ground" electrode D, is shown in FIG. 10.

When the "ground" electrode D, is in inoperative position as shown in FIG. 5, I show novel means for electrically connecting the retracted electrode to the "ground" wire H for the plug. An anchor sleeve N, with its integral spring clip saddle 10, see the enlarged perspective view in FIG. 10, has its sleeve portion received in a bore 11 provided in the inner body A, see FIG. 4. The saddle portion 10, see FIGS. 3 and 5 is received in the groove 8 and when the "ground" pivoted electrode is received in the saddle, there is an electrical connection between the electrode D, and the sleeve N. FIG. 9 shows an enlarged view of a split terminal P, and this terminal is connected to the "ground" wire H for the plug. FIG. 7 shows the split terminal P carried by the split terminal carrier F, and the spool G receives the "ground" wire H. FIG. 5 illustrates the split terminal P received in the sleeve N and when the pivoted electrode D, is received in the saddle 10 it will be in electrical connection with the "ground" wire H. Therefore, FIG. 5 shows the wire H, unwound from the spool G, and connected to the electrical outlet box partially illustrated at Q in this Figure.

The inner body A has a pair of longitudinally extending and spaced apart bores 12 for receiving the two guide pins 13 that project from the end of the split terminal carrier F, see FIGS. 4 and 7. However, the cover disc E, shown in both FIGS. 2 and 7, is placed over the end of the inner body A, and the terminal electrodes B and C, plus the pivoted "ground" terminal D, are positioned in the slots 4, 5 and bore 6, and the inner body is moved within the end cap L before the cover disc E, is placed in position. Also the cable J has been fed through the top cap M, the collar K, the central bore in the spool G, and split terminal carrier F so that its three wires can be received in the three radial grooves 14 in the face of the split terminal carrier F, as shown in FIG. 7. These three wires from the cable J, are then received in three peripheral notches 15 in the cover disc E and then the ends of these wires are received in three slots 16 in the inner body A, and are connected to the correct binding posts 17 for the electrode terminals B and C, and to the binding post 18 for the pivoted "ground" terminal D, see FIG. 6. The cover disc E is next moved against the adjacent end of the inner body A, and is secured thereto by a center externally ribbed pin 19, see FIG. 8, that is passed through the center opening 20 in the disc and is driven into the inner body.

The cover disc E has three openings 21 which register with the binding posts 17 and 18, see FIG. 7, and a screw driver bit, not shown, may be inserted into these openings to tighten or loosen the screws associated with the binding posts 17 and 18. Each of the three radially extending grooves 14 has a yoke-shaped projection 22 for receiving the wires from the cable J. The cover disc E presses the wires into these projections 22 and holds them in place. When the split terminal carrier F, is moved into position against the cover disc E, the split terminal P, is moved into the anchor sleeve N so as to make electrical contact with it. The cover disc has an opening 23 through which the split terminal is moved as is shown in FIG. 7. Also the two guide pins 13 on the split terminal carrier F, are passed through the two openings 24 in the cover disc E before they can enter the two bores 12 in the inner body A, see FIG. 4.

The "ground" wire H from the split terminal P, see FIG. 9, is passed through an opening, not shown, in the split terminal carrier F and when this wire is not used, it is wrapped around the spool G, see FIGS. 3 and 7. A metal clip 25 is attached to the free end of the wire H, and the spool G, has a yoke-shaped projection 26, see FIG. 1, for receiving the wire and holding it in inoperative position. The top cap M, is now screwed onto the end cap L, and the two caps will entirely enclose the inner body A, the cover disc E, and a portion of the split terminal carrier F. The collar K, is screwed into the threaded interior of the spool G. The device is now ready to be used.

When the "ground" terminal electrode G, is to be used with the electric plug, it will project from the plug as shown in FIG. 3. The "ground" wire H, is not used in this instance. However, if the electric outlet Q, see FIG. 5, is not manufactured to receive the "ground" terminal G, it is folded into inoperative and concealed position as illustrated in this Figure, and the "ground" wire H, is unwrapped from its spool H, and is connected to the electric outlet Q. I have already described how the swinging of the "ground" terminal G, into the saddle 10 of the anchor sleeve H, will electrically connect this terminal to the "ground" wire H, through the anchor sleeve and the split terminal P.

I claim:

1. In an electric plug:
    (a) a cable supporting carrier having a central cable receiving bore and three radially extending and spaced apart yokes for receiving two electric current carrying wires and a "ground" wire;
    (b) a cover disc for clamping portions of the three wires in their associate yokes with the end portions of these wires extending beyond said yokes;
    (c) an inner cylindrical body having three slots in its wall for receiving the ends of the three wires and having three longitudinally extending bores with a passage to the body slots;
    (d) two electrode terminals positioned in two of the inner body bores and having wire securing means for securing the ends of the two electric wires to these two terminals;
    (e) a "ground" terminal received in the inner body third bore and having wire securing means at one end for securing the end of the "ground" wire thereto, the opposite end of said "ground" terminal pivotally supporting an extension that can be swung from operative position where the extension is in alignment with the length of said "ground" terminal, into an inoperative position where the extension is at right angles to the length of the "ground" terminal;
    (f) an enclosure for said carrier, cover disc and inner body consisting of two separable parts, a cylindrical end cap housing said inner body and said cover disc and having three openings in its closed end for receiving the two electrode terminals and the "ground" terminal pivoted extension when the latter is in operative position, and a top cap removably secured to said end cap and enclosing said carrier, said carrier having an integral "ground" wire receiving spool extending through an opening in said top cap; and
    (g) a "ground" wire having one end connected to said "ground" terminal and being wrapped around a helical grooved portion of said spool when the extension of said "ground" terminal is in operative position, said inner body having a diametrically extending groove positioned at the pivot point of said extension to said "ground" terminal and designed to receive said pivoted extension when the latter is in inoperative position and is enclosed by said cylindrical end cap, said second "ground" wire being unwrapped from the spiral groove in the spool and connectible to an electric outlet box when said extension is in inoperative position.

* * * * *